US012784329B2

(12) United States Patent
Shen

(10) Patent No.: US 12,784,329 B2
(45) Date of Patent: Nov. 3, 2026

(54) INFORMATION PROCESSING APPARATUS AND METHOD, AND STORAGE MEDIUM

(71) Applicant: CANON KABUSHIKI KAISHA, Tokyo (JP)

(72) Inventor: Yangtai Shen, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 296 days.

(21) Appl. No.: 18/594,062

(22) Filed: Mar. 4, 2024

(65) Prior Publication Data

US 2024/0312121 A1 Sep. 19, 2024

(30) Foreign Application Priority Data

Mar. 13, 2023 (JP) ................................ 2023-038976

(51) Int. Cl.
*G06T 15/20* (2011.01)
*G06T 7/292* (2017.01)
*G06T 7/55* (2017.01)

(52) U.S. Cl.
CPC ............ *G06T 15/205* (2013.01); *G06T 7/292* (2017.01); *G06T 7/55* (2017.01); *G06T 2200/04* (2013.01)

(58) Field of Classification Search
None
See application file for complete search history.

(56) References Cited

U.S. PATENT DOCUMENTS

2022/0343619 A1 10/2022 Shen
2023/0316640 A1 10/2023 Shen

FOREIGN PATENT DOCUMENTS

JP 2019-106170 A 6/2019

OTHER PUBLICATIONS

J. Chen et al. "Fast Free-viewpoint Video Synthesis Algorithm for Sports Scenes," 2019 IEEE/RSJ International Conference on Intelligent Robots and Systems (IROS), Macau, China, 2019, pp. 3209-3215, doi: 10.1109/IROS40897.2019.8967584. (Year: 2019).*
H. Sabirin et al.; "Toward Real-Time Delivery of Immersive Sports Content," in IEEE MultiMedia, vol. 25, No. 2, pp. 61-70, Apr.-Jun. 2018, doi: 10.1109/MMUL.2018.112142739. (Year: 2018).*
Yao, Q. et al., "Accurate Silhouette Extraction of Multiple Moving Objects for Free Viewpoint Sports Video Synthesis" 2015 IEEE 17th International Workshop on Multimedia Signal Processing (Oct. 2015) pp. 1-6, XP032822486.

(Continued)

*Primary Examiner* — Peter Hoang
(74) *Attorney, Agent, or Firm* — Carter, DeLuca & Farrell LLP

(57) ABSTRACT

An information processing apparatus generates, from a plurality of captured images obtained by a plurality of cameras, a plurality of silhouette images representing respective regions of a plurality of objects appearing in the plurality of captured images, obtains associating information representing a silhouette image associated with each object by associating the plurality of silhouette images with each object of the plurality of objects, and generates, based on the associating information corresponding to an object designated from the plurality of objects and a designated virtual viewpoint, a virtual viewpoint image of the designated object.

22 Claims, 13 Drawing Sheets

(56) References Cited

OTHER PUBLICATIONS

Alahi, A. et al., "Sport Players Detection and Tracking with a Mixed Network of Planar and Omnidirectional Cameras" 2009 Third ACM/IEEE International Conference on Distributed Smart Cameras (Aug. 2009) pp. 1-8, XP093183366.

Delannay, D. et al., "Detection and Recognition of Sports(wo)men from Multiple Views" 2009 Third ACM/IEEE International Conference on Distributed Smart Cameras (Aug. 2009) pp. 1-7, XP093183873.

Extended European Search Report issued by the European Patent Office on Jul. 19, 2024 in corresponding EP Patent Application No. 24161981.6.

* cited by examiner

INFORMATION PROCESSING APPARATUS AND METHOD, AND STORAGE MEDIUM

BACKGROUND OF THE INVENTION

Field of the Invention

The present disclosure relates to an information processing apparatus and method, and a storage medium.

Description of the Related Art

In recent years, a technology of arranging a plurality of photographing apparatuses to capture an image of an object, estimating a three-dimensional shape of the object using captured images of a plurality of viewpoints obtained, and generating a virtual viewpoint image from an arbitrary virtual viewpoint has attracted attention. According to this technique, a virtual viewpoint image can be generated even when a plurality of objects are present in a photographing space. Thus, the viewer can view the movement of a plurality of objects from an arbitrary viewpoint, and can obtain a sense of presence higher than that of a normal video.

On the other hand, there is also a demand for generating a virtual viewpoint image in which only a specific object in the photographing space is captured. For example, in sports competition, there is a demand for generating a virtual viewpoint video in which a referee or an audience is not shown and only a player is shown. Furthermore, for example, in video production, there is a demand that a plurality of performers simultaneously perform at the time of photographing, and that a video of each performer is generated at the time of generating a virtual viewpoint image.

However, in a technique of generating a general virtual viewpoint image, it is difficult to generate and display only a virtual viewpoint image of a specific object among a plurality of objects. Japanese Patent Laid-Open No. 2019-106170 (hereinafter referred to as Patent Document 1) discloses a technique for preventing a defect from occurring in a three-dimensional shape of an object even when a specific structure blocks the object. According to such a technique, a virtual viewpoint image of only a player can be generated from a captured image in which a specific structure and the player are captured. However, in Patent Document 1, although a virtual viewpoint video can be generated by separating a specific structure and a player from each other, it does not correspond to a process of generating a virtual viewpoint image of only a designated player from the captured image in which a plurality of players are captured.

SUMMARY OF THE INVENTION

An aspect of the present disclosure provides a technique for generating a virtual viewpoint image of an object designated as a generation target.

According to one aspect of the present invention, there is provided an information processing apparatus comprising: a first generating unit configured to generate, from a plurality of captured images obtained by a plurality of cameras, a plurality of silhouette images representing respective regions of a plurality of objects appearing in the plurality of captured images; an obtaining unit configured to obtain associating information representing a silhouette image associated with each object by associating the plurality of silhouette images with each object of the plurality of objects; and a second generating unit configured to generate, based on the associating information corresponding to an object designated from the plurality of objects and a designated virtual viewpoint, a virtual viewpoint image of the designated object.

Further features of the present invention will become apparent from the following description of exemplary embodiments with reference to the attached drawings.

DESCRIPTION OF THE EMBODIMENTS

Figure 1A:
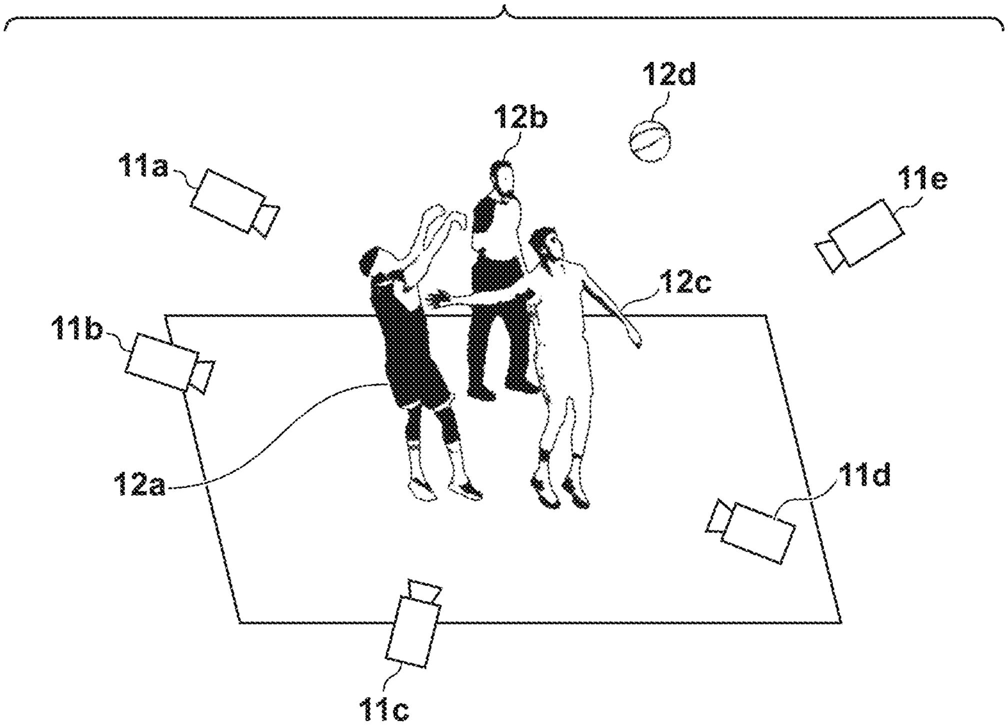
FIGS. 1A and 1B are diagrams illustrating examples of a real space in which an object is photographed and a generated virtual viewpoint image.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that terms that differ only in the alphabet given after the number in the reference numerals indicate different instances of apparatuses having the same or similar functions.

First Embodiment

Figure 1B:
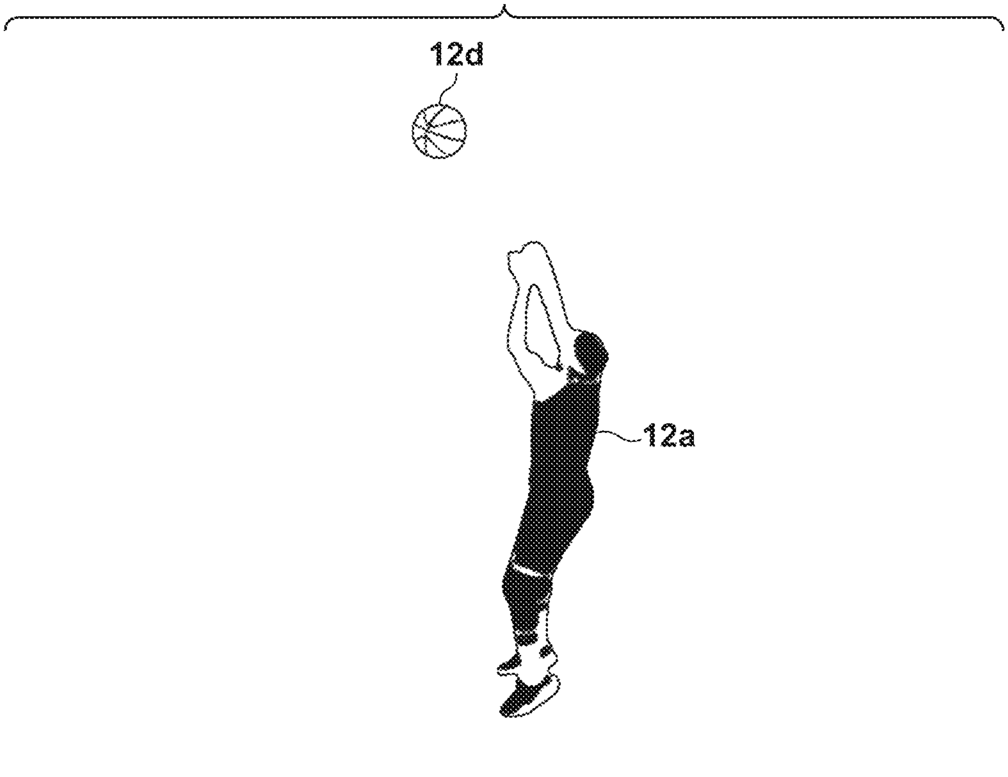

In the first embodiment, an information processing system in which objects 12*a* to 12*d* are image-captured by a plurality of cameras 11*a* to 11*e* and a virtual viewpoint image of a designated object is generated will be described as illustrated in FIG. 1A. For example, when the objects 12*a* and 12*d* are designated as generation targets, the information processing system generates a virtual viewpoint image of only the object 12*a* and the object 12*d* of the designation target such as in FIG. 1B.

Figure 2:
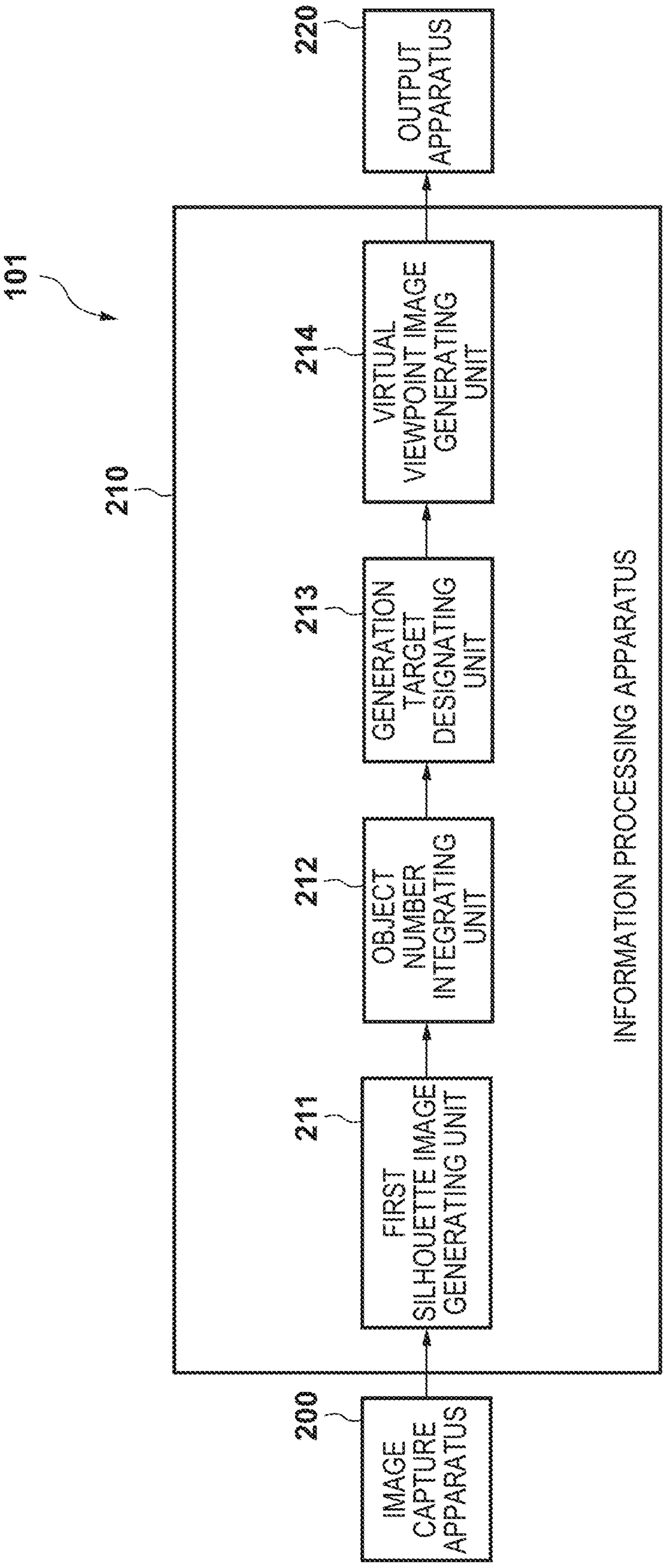
FIG. 2 is a block diagram illustrating a configuration example of an information processing system according to a first embodiment.

FIG. 2 illustrates a configuration example of the information processing system 101 according to the first embodiment. The information processing system includes an image capture apparatus 200, an information processing apparatus 210, and an output apparatus 220. The information processing apparatus 210 includes functional units of a first silhouette image generating unit 211, an object number integrating unit 212, a generation target designating unit 213, and a virtual viewpoint image generating unit 214. Note that the information processing system 101 may be configured by one information processing apparatus. For example, the image capture apparatus 200 and the output apparatus 220 may be realized by the information processing apparatus 210. Furthermore, the information processing apparatus 210 may be configured by one electronic device or a plurality of electronic devices.

Next, an operation of each configuration of the information processing system 101 will be described. The image capture apparatus 200 includes a plurality of cameras 11*a* to 11*e* which are installed so as to surround an object and perform photographing in synchronization with each other. The image capture apparatus 200 assigns a frame number and a time code to a plurality of images captured by the cameras 11*a* to 11*e* (hereinafter referred to as a plurality of captured images) and transmits the images to a first silhouette image generating unit 211. Note that the number of cameras included in the image capture apparatus 200 is not particularly limited.

Figure 3A:
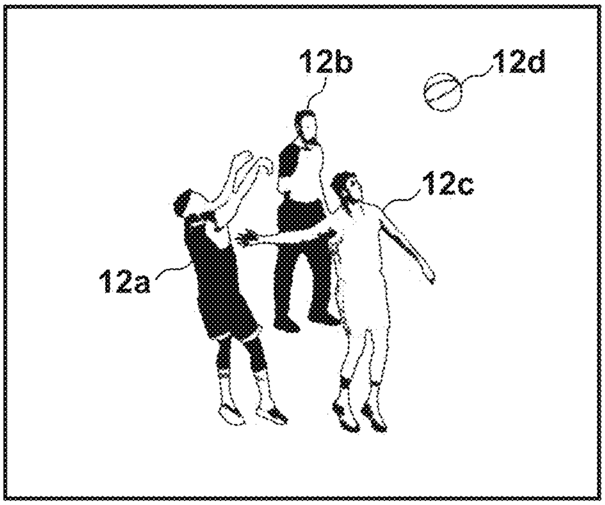
FIGS. 3A to 3D are diagrams schematically illustrating examples of a captured image, a first silhouette image, and a second silhouette image.
Figure 3B:
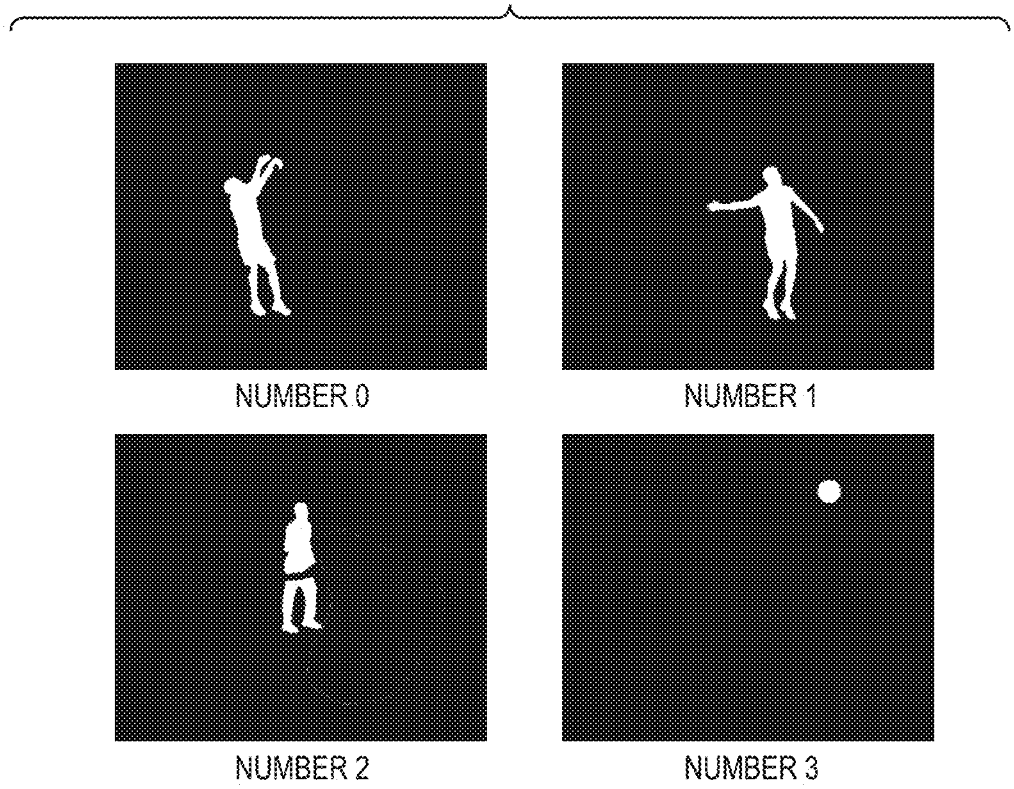

The first silhouette image generating unit 211 generates a silhouette image indicating a region (foreground region) of each of a plurality of objects shown in a plurality of captured images from a plurality of captured images obtained from the image capture apparatus 200. Furthermore, the first silhouette image generating unit 211 generates an object number representing each object for each captured image, and associates the object number with the silhouette image generated from the captured image. For example, when the captured image as illustrated in FIG. 3A is input from the image capture apparatus 200, the first silhouette image generating unit 211 generates the first silhouette image and the object number as illustrated in FIG. 3B. In FIG. 3B, number 0 is assigned to object 12*a*, number 2 is assigned to object 12*b*, number 1 is assigned to object 12*c*, and number 3 is assigned to object 12*d*. Since the object number is independently assigned for each captured image, the same object number is not necessarily assigned to one object with regards to a plurality of captured images. Furthermore, as in the object 12*c* and the object 12*b* numbered 1 and 2 in FIG. 3B, in a case where occlusion occurs due to the anteroposterior relationship of the objects, the occluded region of the object 12*b* (number 2) behind is not included in the silhouette image of the object 12*b*. The generated silhouette image of each object and the number of the object are output to the object number integrating unit 212.

Note that any existing technology can be used as a method of generating a silhouette image and a method of assigning an object number. For example, in generation of a silhouette image, well-known instance segmentation can be used to separate a plurality of objects included in a captured image. Furthermore, for example, the object number can be assigned in the order of high probability of becoming the object obtained by the instance segmentation process. Since the first silhouette image generating unit 211 independently processes each of the plurality of captured images, there is a possibility that the same object has different object numbers between the captured images as described above. Therefore, the object number integrating unit 212 determines a correspondence relationship of the objects between the captured images, and associates a silhouette image (object number) with each object of the plurality of objects. Hereinafter, associating a silhouette image (object number) with each object is also referred to as integration.

The object number integrating unit 212 associates (integrates) the plurality of silhouette images generated by the first silhouette image generating unit 211 for each of the plurality of objects, thereby obtaining associating information representing the associated silhouette image for each object. Here, the associating information is a set of silhouette images (object numbers) for each object, and is integrated so that object numbers assigned to the same object among object numbers obtained from each captured image represent the same object. In the present embodiment, the object number integrating unit 212 obtains a three-dimensional shape using a plurality of silhouette images, and associates the plurality of silhouette images for each object based on the position of the projection area when each of the plurality of silhouette images is projected onto the obtained three-dimensional shape.

Figure 4A:
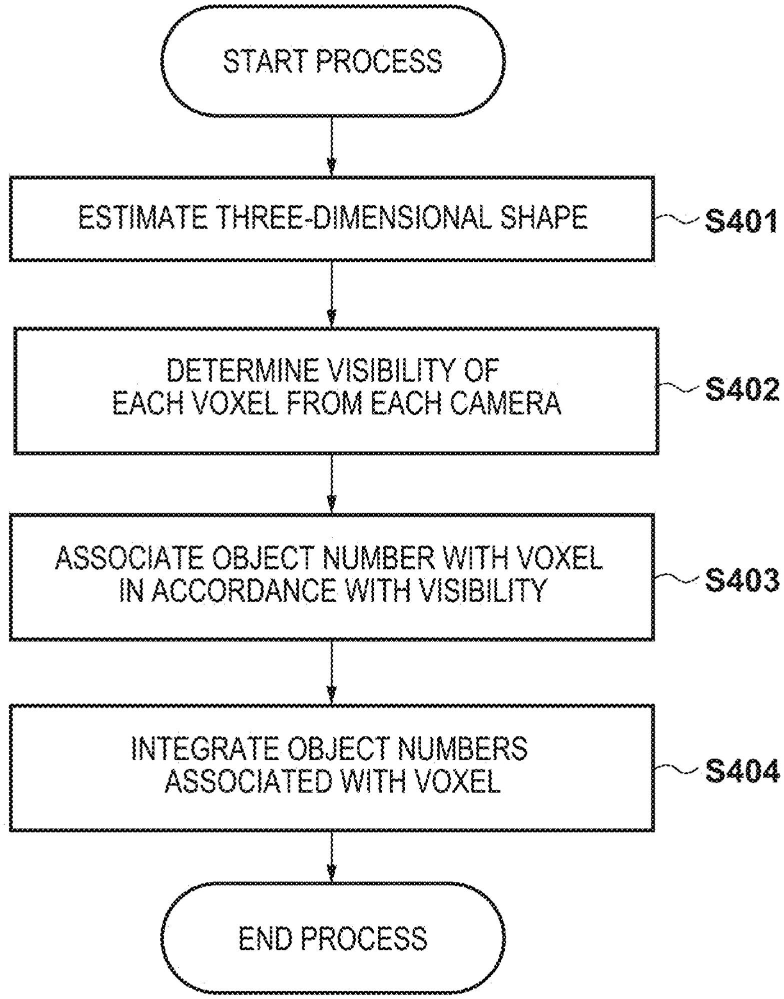
FIG. 4A is a flowchart illustrating an object number integrating process according to the first embodiment.

An example of a specific process of the object number integrating unit 212 will be described with reference to a flowchart of FIG. 4A. In S401, the object number integrating unit 212 estimates the three-dimensional shape of the object using the first silhouette image generated by the first silhouette image generating unit 211. Note that the method of estimating the three-dimensional shape is not limited in the present disclosure. For example, a well-known technique such as a volume intersection method or a stereo method can be used. The object number integrating unit 212 estimates a three-dimensional shape using the first silhouette image of each object as it is. However, the result (e.g., a silhouette image of a logical sum of all or any combination of the four first silhouettes numbered 0 to 3 in FIG. 3B) of the logical sum synthesis of the first silhouette image obtained from one captured image may be used for the estimation of the three-dimensional shape. The three-dimensional shape estimation result is a set of elements representing the three-dimensional shape of the photographed object. The element includes a voxel or a point, and for example, the three-dimensional shape of the object is represented by a voxel group or a point group. Note that the spatial resolution of the element (voxel, point, or the like) may be lower than that of the captured image in order to reduce the amount of calculation. Hereinafter, it is assumed that the three-dimensional shape is represented by a voxel group.

In S402, the object number integrating unit 212 determines visibility of each voxel from each camera (also referred to as visibility of each voxel in each captured image) using the first silhouette image and the three-dimensional shape of the object estimated in S401, and obtains visibility information. Here, when the target voxel is not occluded by another object and the target voxel is directly image captured from the camera, the target voxel is determined to be visible from the camera or in the captured image. On the other hand, if the target voxel is not within the angle of view of the captured image or is occluded by another object, it is determined that the target voxel is not visible from the camera or in the captured image. Note that a method of determining the visibility is not particularly limited. For example, occlusion by another object may be determined using distance information of each voxel to be an object obtained from the captured image. Since the distance information can also be used to generate a second silhouette image to be described later, the object number integrating unit 212 stores the obtained distance information together with the first silhouette image.

In S403, the object number integrating unit 212 associates the object number assigned to each voxel in each captured image based on the visibility information obtained in S402. More specifically, the object number integrating unit 212 projects the first silhouette image obtained from the captured image onto the three-dimensional shape estimated in S401, and associates the object number of the first silhouette image with the voxel existing in the projection area and determined to have visibility in the captured image. An object number is not associated with a voxel that does not have visibility or a voxel that is not an object. Through this process, the object number assigned in all the captured images or some of the captured images is associated with the voxel to be the surface of the object. Furthermore, the object number is not associated with a voxel of an object that is not a surface or a voxel that is not an object.

Figure 4B:
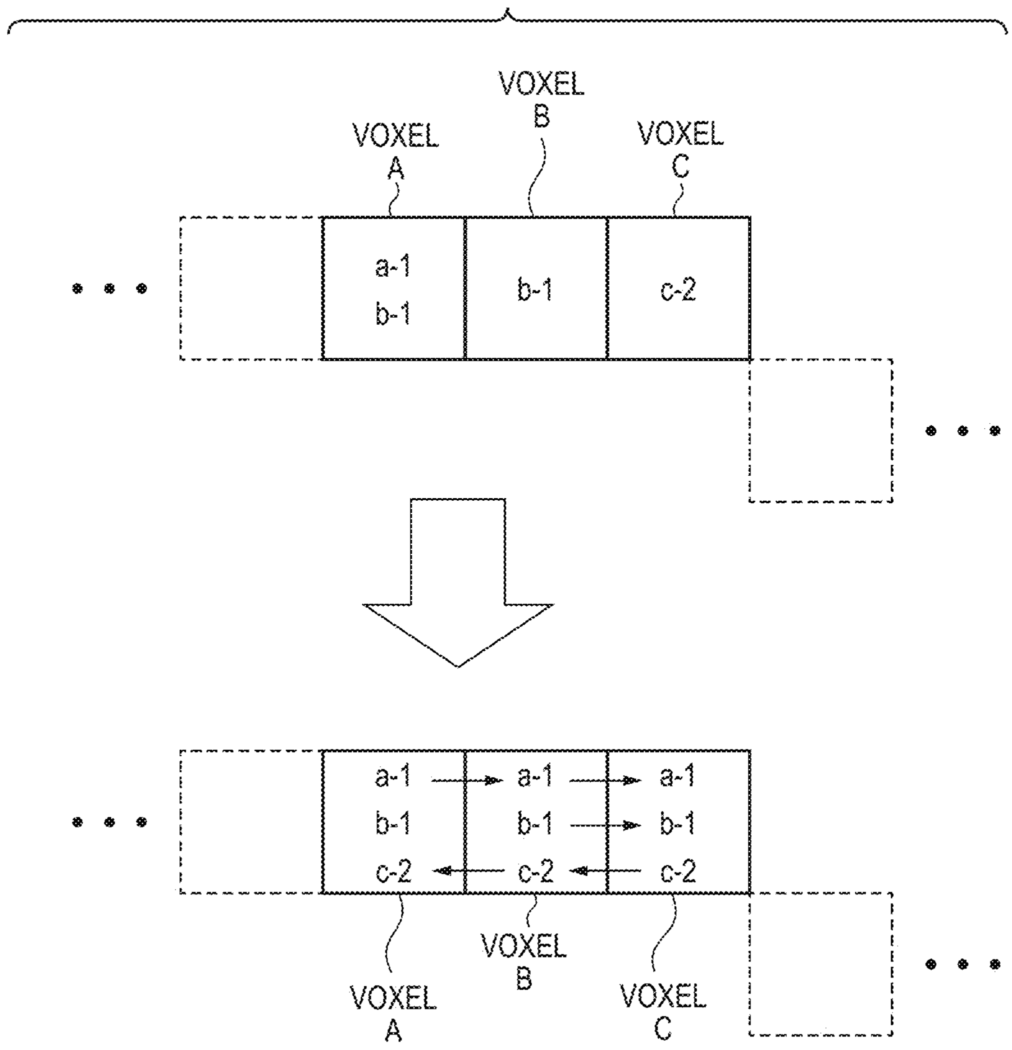
FIG. 4B is a diagram for explaining replenishment of the object number to the voxel.

Note that, in the process of associating the object number with the voxel based on the projection area of the first silhouette image, the combination of the associated object numbers may differ among the voxels constituting the same object. In addition, depending on a three-dimensional shape generation method or the like, there may be a voxel to which no object number of the captured image is associated although the voxel is the surface of the object. For example, the upper part of FIG. 4B schematically illustrates a state in which object numbers are associated with voxels A to C of a certain object. Object number 1(a-1) in a captured image a, object number 1(b-1) in a captured image b, and an object number 2(c-2) in a captured image c are associated with voxels A, B, and C, respectively. Here, it is assumed that the voxel C is a portion visible only in the captured image c, and only the voxel C is visible in the captured image c. In this case, c-2 cannot be associated with a-1 and b-1. Therefore, as illustrated in the lower part of FIG. 4B, the object number associated with the voxel is supplemented based on the object number associated with the neighboring or adjacent voxel (e.g., the closest voxel). Through this process, the object numbers a-1, b-1, and c-2 obtained from the plurality of captured images are integrated as representing the same object.

In S404, the object number integrating unit 212 associates the object numbers, assuming that the object numbers assigned to one voxel represent the same object. This determination is performed on all the voxels, and object numbers are associated for each object to obtain associating information representing a set of object numbers associated for each object. For example, in the case illustrated in the lower part of FIG. 4B, a-1, b-1, and c-2 are associated as object numbers representing the same object, and associating information representing a set of object numbers of a-1, b-1, and c-2 is obtained. Thus, for example, when an object corresponding to a-1 is selected, three first silhouette images corresponding to a-1, b-1, and c-2 are specified. Note that voxels having different combinations of object numbers may appear in voxels of the same object due to, for example, another object being adjacent. For example, a-2, b-1, and c-2 may exist in addition to the combination illustrated in FIG. 4B. However, in general, the number of voxels to which a correct combination of object numbers is assigned to one object is larger than the number of voxels to which an incorrect combination is assigned. Therefore, the object numbers can be correctly integrated by integrating the combinations of the object numbers assigned to the voxels using the majority decision. Through the above process, it is possible to know the object number of the object represented by the object number in a certain captured image in another captured image.

Note that a unique object identification number may be assigned to one object represented by the associated object number. Furthermore, at the time of integration, the object numbers may be integrated using the object identification numbers of the past frames by tracking the object. More specifically, first, the object numbers are integrated for each frame, and the correspondence between the object and the object identification number is determined. Next, a state of overlap between objects in the previous frame and the current frame is detected, and objects having many overlaps are determined as the same object. The same object identification number is inherited to the same object between frames by assigning the object identification number of the previous frame to the object of the current frame determined to be the same object. As a result, in a case where the same object is set as the generation target over a plurality of frames, a generation target designating unit 213 does not need to designate the generation target for each frame.

Figure 5A:
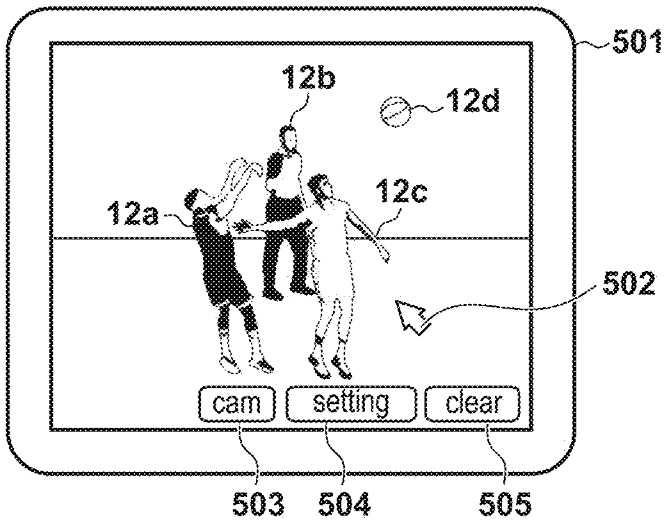
FIGS. 5A to 5C are diagrams illustrating examples of a user interface of a generation target designating unit according to the first embodiment.
Figure 5B:
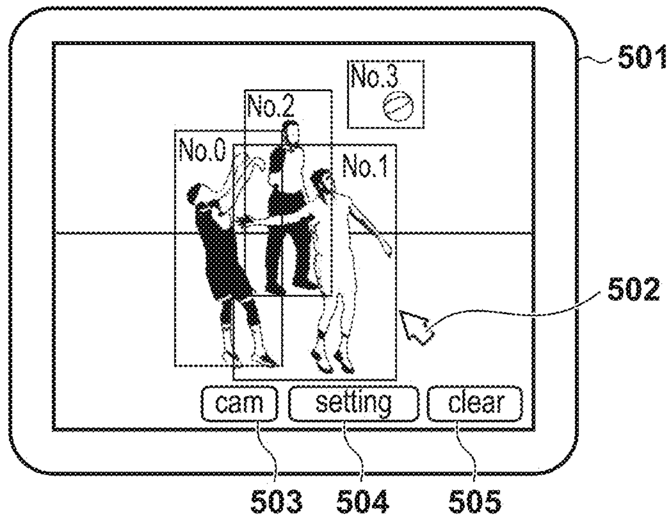
Figure 5C:
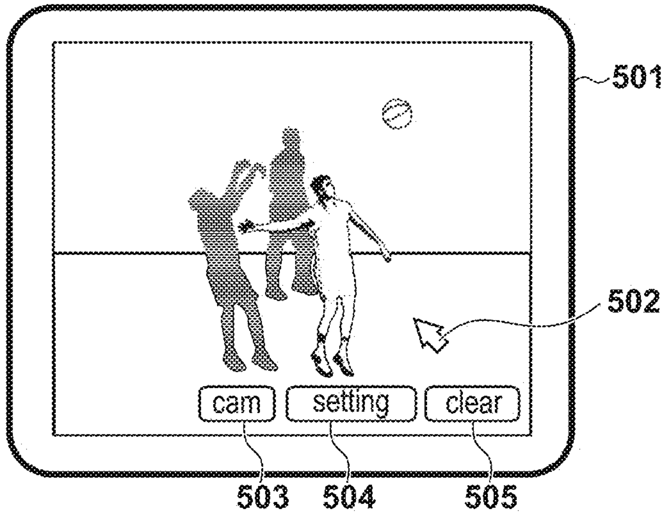

Returning to FIG. 2, the generation target designating unit 213 displays the captured image or the virtual viewpoint image of the past frame, and accepts an external input for designating a generation target or an object that is not the generation target. The generation target designating unit 213 obtains the object number of the object designated as the generation target, and outputs the object number to the virtual viewpoint image generating unit 214. For example, the generation target designating unit 213 provides the user with a user interface of a display screen as illustrated in FIG. 5A, and accepts a user operation for designating a generation target. That is, the generation target designating unit 213 displays the captured image (or the virtual viewpoint image generated in the past frame) on the display device 501, and accepts designation of the object by the user operation. Note that, as illustrated in FIG. 5B, the object number (or the object identification number) may be displayed on the object existing in the display screen. Furthermore, in order to distinguish between the object of the current generation target and the object that is not the generation target, the appearance of the object that is not the generation target may be made different from that of the object of the generation target. For example, as illustrated in FIG. 5C, an object that is not a generation target using the first silhouette image may be filled with, for example, a horizontal line pattern according to the setting of the appearance of the object that is not a generation target. In a case where the virtual viewpoint image is displayed on the user interface, the object of the generation target and the object that is not the generation target may be displayed in an identifiable manner. For example, an object that is not a generation target may be displayed translucently or transparently by setting transparency to an object that is not a generation target. The virtual viewpoint image to be displayed on the display device 501 can be generated, for example, by the virtual viewpoint image generating unit 214 (described later).

The designation of the generation target is performed by designating an object for which the virtual viewpoint image is to be generated or an object for which the virtual viewpoint image is not to be generated with an operation of a cursor 502 and a click operation by a mouse (not illustrated) on the display screen of the display device 501. Note that the user operation for designating the object may be a touch operation on the touch panel. The object designated by the user operation can be determined by determining to which object number silhouette of the first silhouette image the designated region belongs. For example, in a case where the regions of the object 12*a* and the object 12*b* are designated among the objects 12*a* to 12*d* present in the display image, the object 12*a* and the object 12*b* are determined to be not the generation targets, and the object 12*c* and the object 12*d* are determined to be the generation targets. The generation target designating unit 213 does not output the object number of the object (object that is not the generation target) designated by the designating operation to the virtual viewpoint image generating unit 214, and outputs the object number of the object that is not designated to the virtual viewpoint image generating unit 214. Note that, although the case where the designated object is excluded from the generation target has been described above, in a case where the designated object is set as the generation target, the designated objects 12*a* and 12*b* are set as the generation targets.

A camera button 503 is used to switch a captured image displayed on the user interface. For example, when the camera button 503 is operated, a user interface for inputting the number of the photographed image (or the number of the camera) is displayed. When the user designates the number of the captured image (or camera) in the user interface, the displayed captured image is switched. Note that the switching of the image by the camera button 503 may include a virtual viewpoint image. A setting button 504 is used to set the appearance of an object that is not a generation target. For example, when the setting button 504 is operated, a user interface for the user to input a value of transparency is provided.

When a clear button 505 is operated, the designating operation on the object is canceled. When the clear button 505 is operated, the generation target designating unit 213 designates all the objects as generation targets, and outputs the object numbers of all the objects to the virtual viewpoint image generating unit 214. Furthermore, for example, a user interface for inputting the object number in response to the operation of the clear button 505 may be provided, and the designated state of the object with the input object number may be released. This makes it possible to individually cancel the selection of the object. Unless the designated state of the object is canceled by the clear button 505, the designated state of the object designated in the current frame may be maintained in another frame.

Returning to FIG. 2, the virtual viewpoint image generating unit 214 generates the virtual viewpoint image of the object designated as the generation target based on the associating information corresponding to the object designated as the generation target from the plurality of objects by the generation target designating unit 213 and the designated virtual viewpoint. Furthermore, the virtual viewpoint image generating unit 214 generates a virtual viewpoint image to be displayed on the display device 501 by the generation target designating unit 213.

Figure 3C:
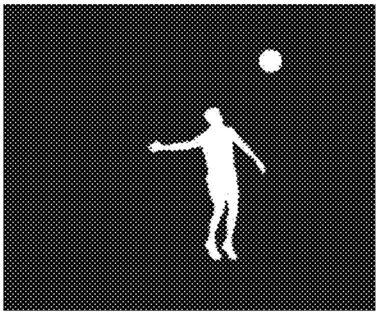
Figure 6:
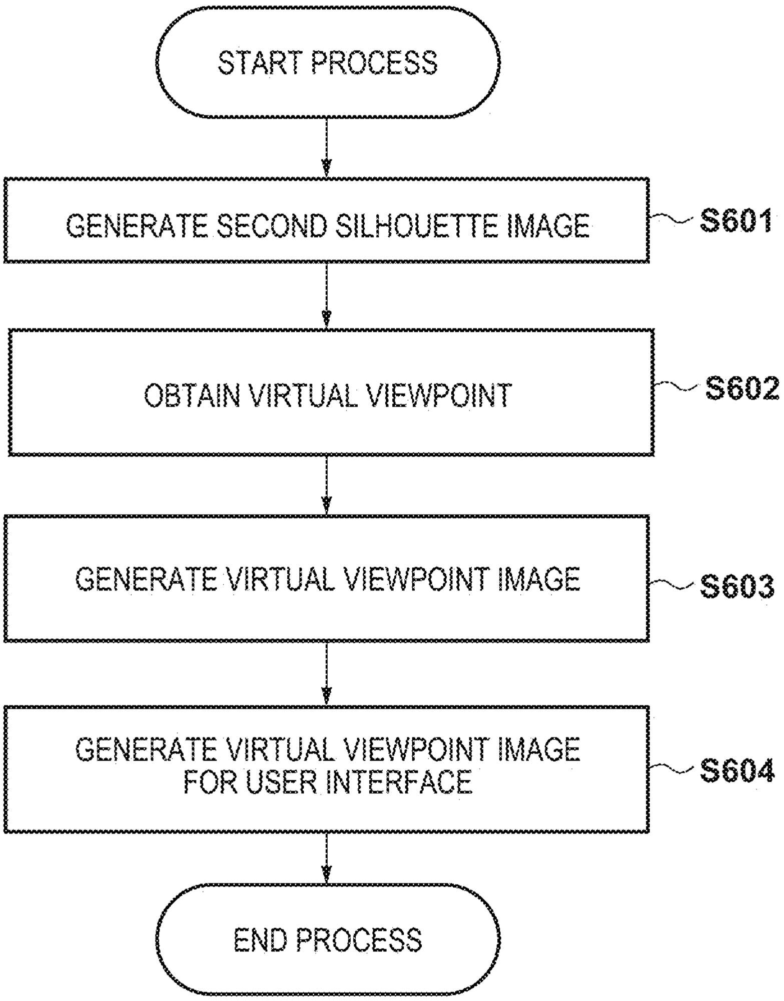
FIG. 6 is a flowchart illustrating a virtual viewpoint image generating process according to the first embodiment.

The operation of the virtual viewpoint image generating unit 214 will be described in more detail with reference to the flowchart of FIG. 6. In S601, the virtual viewpoint image generating unit 214 generates the second silhouette image in which only the generation target exists, using the first silhouette image and the object number designated by the generation target designating unit 213. For example, assumed that the first silhouette image of FIG. 3B and the object number are obtained for the captured image of FIG. 3A, and number 1 (object 12*c*) and number 3 (object 12*d*) are designated as the generation targets by the generation target designating unit 213. In this case, as illustrated in FIG. 3C, the second silhouette image is generated by performing logical sum synthesis of the first silhouette images of number 1 and number 3.

Figure 3D:
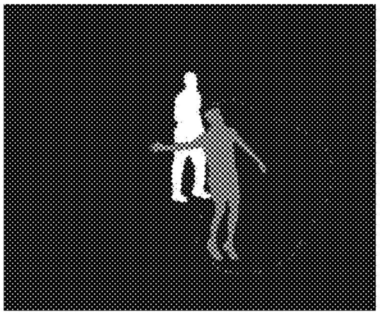

Furthermore, when an object that is not a generation target is present in front of the generation target, the object can be an object (occlusion object) that occludes the generation target. There is a possibility that the generation of the virtual viewpoint image is adversely affected by the presence of the occlusion object. Therefore, another object in front of the generation target and within a certain range from the object of generation target is determined as the occlusion object. The first silhouette image of the object determined as the occlusion object is taken into the second silhouette image so as to indicate that it is the occlusion object. For example, in a case where the silhouette image of an object of a generation target and the silhouette image of another object are in contact with each other, or in a case where the distance between the closest pixels of the silhouette images is within a certain threshold value, it is determined that the other object is an occlusion object. For example, in a case where number 2 in FIG. 3B is an object of a generation target, objects of numbers 0, 1, and 3 are present. Here, for example, in a case where the occlusion object is determined by the contact of the silhouette image, the object of number 1 in contact with the first silhouette image of the object of number 2 is determined as the occlusion object. FIG. 3D illustrates the second silhouette image generated in this case, in which the silhouette region of the object of number 1 serving as the occlusion object and the silhouette region of the object of number 2 serving as the generation target are generated in a distinguishable manner. For example, the silhouette region of the object of number 1 serving as the occlusion object has a value different from that of the silhouette region of the object of number 2 serving as a generation target.

In S602, the virtual viewpoint image generating unit 214 obtains information of the virtual viewpoint for generating the virtual viewpoint image. The information of the virtual viewpoint is optical information such as at least a camera position attitude and an angle of view of the virtual viewpoint. The information of the virtual viewpoint is associated with a frame number or a time code given to the captured image. The information of the virtual viewpoint can be generated by an operation of an input device such as a mouse or a keyboard. Alternatively, information of temporally continuous virtual viewpoints generated in advance may be obtained from the storage device.

In S603, the virtual viewpoint image generating unit 214 generates a virtual viewpoint image of the object designated as the generation target from the virtual viewpoint obtained in S602 based on the captured image and the information on the silhouette region and the occlusion region of the second silhouette image generated in S601. Note that in the present disclosure, a method for generating a virtual viewpoint image is not limited. For example, there is a method of performing shape estimation using the second silhouette image and rendering the appearance of the virtual viewpoint based on color information. In addition, a generation target may be cut out from the captured image using the second silhouette image, and a three-dimensional space may be reproduced and rendered using a Neural Radiance Fields (NeRF) method which is deep learning. The virtual viewpoint image generating unit 214 outputs the virtual viewpoint image of the generation target to the output apparatus 220. At this time, the virtual viewpoint image generating unit 214 also generates a virtual viewpoint image in which all the objects are set as generation targets using the first silhouette image for the process of S604. When the occlusion region is included, it is generated with a transparency set in advance. Furthermore, in a case where the second silhouette image generated in S601 includes the silhouette region (information of the occlusion region) of the object (occlusion object) in the occlusion relationship as illustrated in FIG. 3D, the virtual viewpoint image generating unit 214 may generate the virtual viewpoint image distinguishably between the occlusion object and the object of generation target. For example, the virtual viewpoint image of the object in the occlusion relationship may be generated with a transparency different from transparency of the virtual viewpoint image of the object of generation target.

In S604, the virtual viewpoint image generating unit 214 detects a difference between the virtual viewpoint image of the generation target generated in S603 and the virtual viewpoint images of all objects, and generates a virtual viewpoint image to be displayed by the generation target designating unit 213 in accordance with the setting of the appearance of an object that is not the generation target. For example, the virtual viewpoint image of the generation target and the virtual viewpoint image of the difference are combined (alpha-blended) according to the setting of the transparency of the object that is not the generation target. Note that this process is an example of a process of displaying the virtual viewpoint image of the object of the generation target and the virtual viewpoint image of the object that is not the generation target in a distinguishable manner. Note that when the virtual viewpoint image of the past frame is not displayed in the generation target designating unit 213, the generation of the virtual viewpoint image in which all the objects are set as the generation targets in S603 and the process in S604 may be omitted.

Returning to FIG. 2, the output apparatus 220 displays the virtual viewpoint image generated by the virtual viewpoint image generating unit 214 on a display device such as a display or transmits the virtual viewpoint image to an accumulation device such as a server.

Note that in the above description, one virtual viewpoint is assumed, but the present invention is not limited thereto, and the present embodiment can also be applied to a plurality of virtual viewpoints. For example, it is possible to respond by using a plurality of virtual viewpoint image generating units 214.

Figure 7:
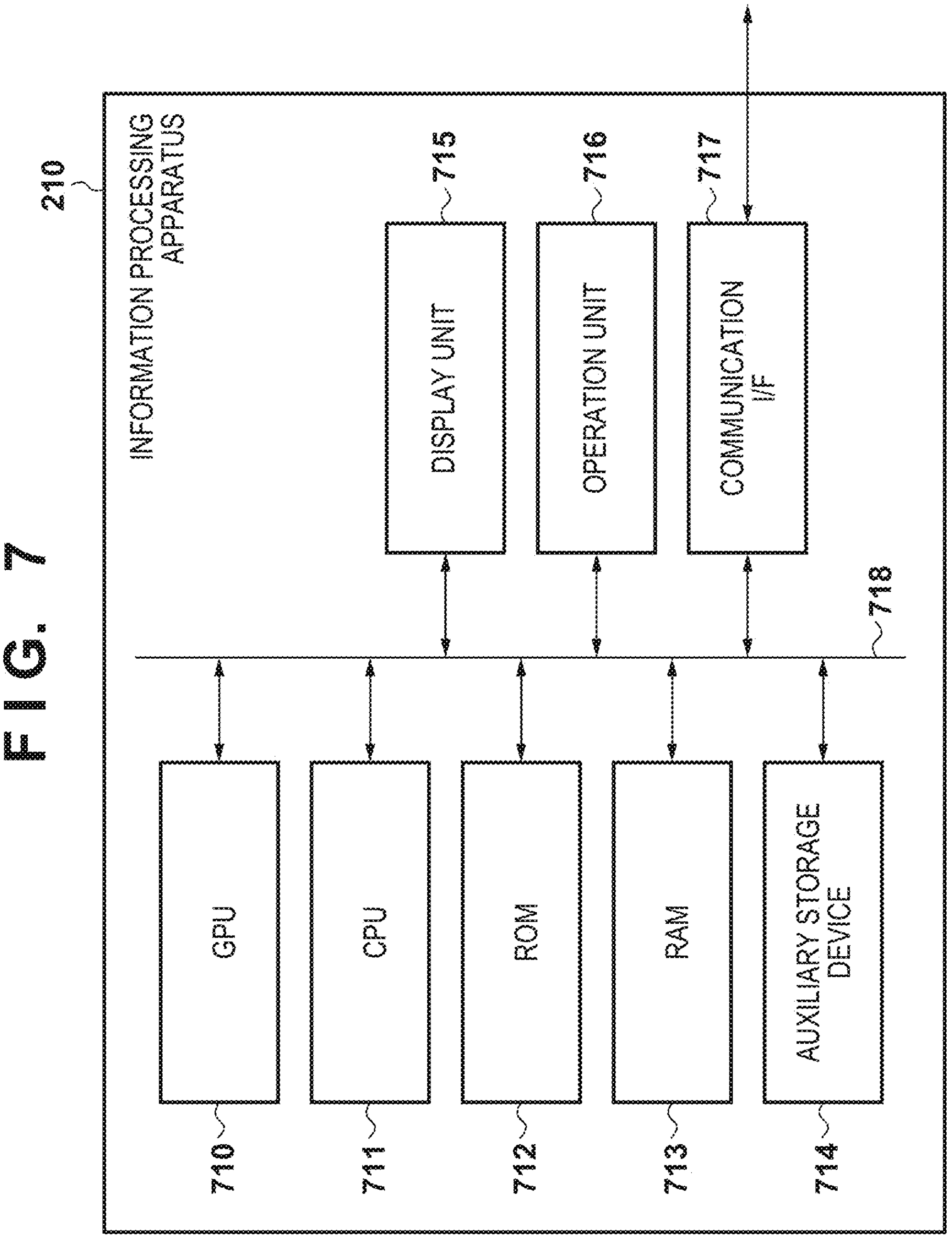
FIG. 7 is a block diagram illustrating an example of a hardware configuration of an information processing apparatus according to the first embodiment.

A hardware configuration of the information processing apparatus 210 for realizing the above functions will be described with reference to FIG. 7. The information processing apparatus 210 includes a calculation unit for performing image processing and three-dimensional shape generation, the calculation unit including a graphics processing unit (GPU) 710 and a central processing unit (CPU) 711. Furthermore, the information processing apparatus 1 includes a storage unit with a read only memory (ROM) 712, a random access memory (RAM) 713, and an auxiliary storage device 714. The information processing apparatus 1 further includes a display unit 715, an operation unit 716, a communication I/F 717, and a bus 718.

The CPU 711 realizes each functional unit of the information processing apparatus 210 by controlling the entire video generation apparatus using computer programs and data stored in the ROM 712 and the RAM 713. The CPU 711 also operates as a display control unit that controls the display unit 715 and an operation control unit that controls the operation unit 716. The GPU 710 can perform efficient calculation by processing more data in parallel. Therefore, in the first embodiment, the GPU 710 is used in addition to the CPU 711 to realize the first silhouette image generating unit 211, the object number integrating unit 212, the generation target designating unit 213, and the virtual viewpoint image generating unit 214. In a case where the program is executed, the calculation may be performed by only one of the CPU 711 and the GPU 710, or the CPU 711 and the GPU 710 may perform the calculation in cooperation with each other. Note that the information processing apparatus 210 includes one or a plurality of dedicated hardware different from the CPU 711, and the dedicated hardware may execute at least a portion of a process to be executed by the CPU 711. Examples of the dedicated hardware include an application specific integrated circuit (ASIC), a field programmable gate array (FPGA), and a digital signal processor (DSP).

The ROM 712 stores a program or the like that is not required to be changed. The RAM 713 temporarily stores a program or data supplied from the auxiliary storage device 714, and data or the like externally supplied via the communication I/F 717. The auxiliary storage device 714 is configured by, for example a hard disk drive or the like, and stores various types of data such as image data and audio data.

The display unit 715 is configured by, for example, a liquid crystal display, an LED, or the like, and displays a graphical user interface (GUI) or the like for a user to operate the information processing apparatus 210. For example, the display unit 715 includes a display device 501, and can provide the user interface described with reference to FIGS. 5A to 5C. The operation unit 716 is configured by, for example, a keyboard or a mouse, a joy stick, a touch panel, or the like, and inputs various instructions to the CPU 711 when receiving a user operation.

The communication I/F 717 is used for communication with a device outside the video generation apparatus. For instance, in a case where the video generation apparatus is in wired connection with an external device, a cable for communication is connected to the communication I/F 717. In a case where the video generation apparatus has a function of wirelessly communicating with an external device, the communication I/F 717 includes an antenna. The bus 718 connects the respective units of the video generation apparatus to transmit information.

As described above, according to the first embodiment, the generation target of the virtual viewpoint image can be freely designated, and the virtual viewpoint image of the generation target can be generated without being restricted in terms of the position, posture, and occlusion state between the object that is the generation target and the object that is not the generation target. Furthermore, according to the first embodiment, with the function of tracking the object, the generation of the virtual viewpoint image of the generation target can be automatically continued even if the generation target moves to an arbitrary position in the moving image.

Second Embodiment

Generation of the virtual viewpoint image requires processing of a plurality of captured images, and in particular, in a case where a plurality of objects are designated as generation targets, this may be a time-consuming process. In the second embodiment, in a case where there are a plurality of objects to be the generation target, the processing speed is increased by executing generation of a plurality of virtual viewpoint images in parallel. More specifically, in the second embodiment, a virtual viewpoint image is independently generated for each designated generation target, and the generated virtual viewpoint images are combined based on distance information from the virtual viewpoint to each object, thereby obtaining a virtual viewpoint image of the generation target.

Figure 8:
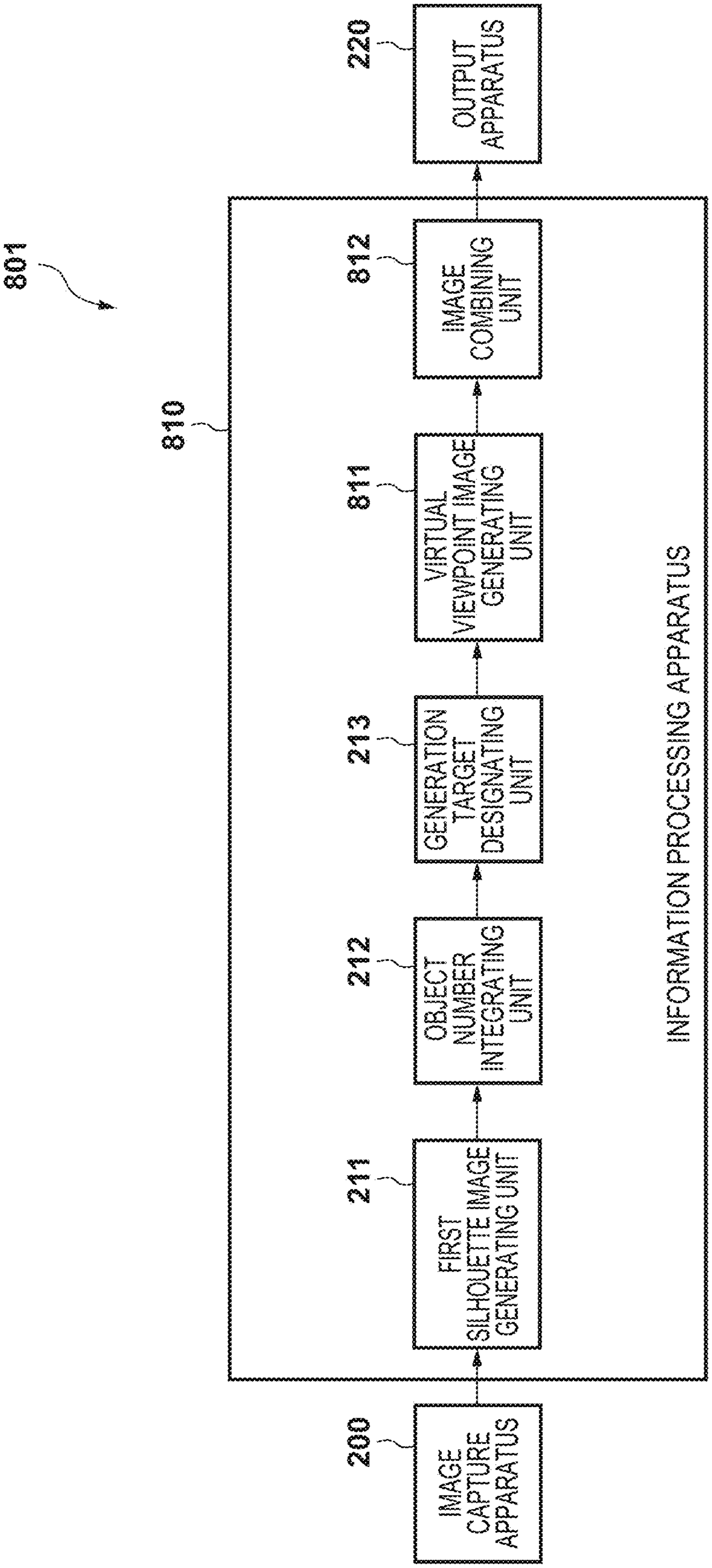
FIG. 8 is a block diagram illustrating a configuration example of an information processing system according to a second embodiment.

The functional configuration of the information processing apparatus 810 in the information processing system 801 according to the second embodiment will be described with reference to FIG. 8. In FIG. 8, functional components having the same functions as those of the first embodiment are denoted by the same reference numerals, and differences between the second embodiment and the first embodiment will be mainly described. Note that the information processing system 801 may be configured by one information processing apparatus. For example, the image capture apparatus 200 and the output apparatus 220 may be implemented by the information processing apparatus 810. Furthermore, the information processing apparatus 810 may be configured by one electronic device or may be configured by a plurality of electronic devices. Furthermore, the information processing apparatus 810 according to the second embodiment can be implemented by the same hardware configuration as that of the first embodiment (FIG. 7).

Figure 9:
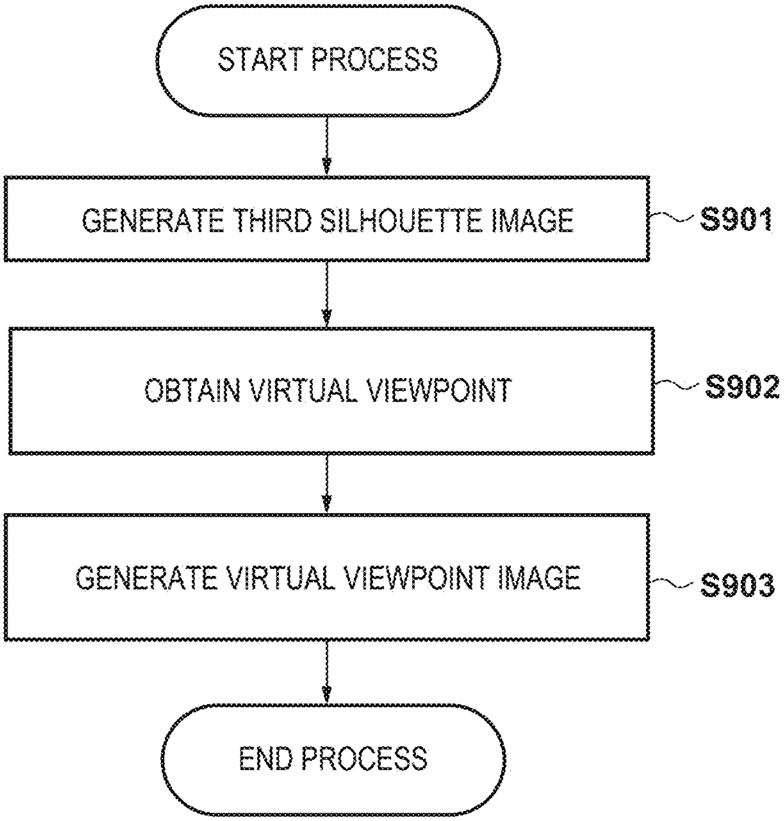
FIG. 9 is a flowchart illustrating a virtual viewpoint image generating process according to the second embodiment.

Operations of the virtual viewpoint image generating unit 811 and the image combining unit 812 according to the second embodiment will be described with reference to a flowchart of FIG. 9. In S901, the virtual viewpoint image generating unit 811 generates a third silhouette image in which only one generation target exists, using the first silhouette image and the object number designated by the generation target designating unit 213. In the first embodiment described above, in a case where a plurality of objects are designated as generation targets, one second silhouette image in which the plurality of objects exist is generated. On the other hand, in the second embodiment, a plurality of third silhouette images in which only one object exists are generated. A method of generating the third silhouette image is the same as that of generating the second silhouette image according to the first embodiment except that the logical sum synthesis is not performed on the silhouette images of the plurality of objects. For example, in a case where the objects 12*c* and 12*d* in FIG. 3A are designated as generation targets, the silhouette images of number 1 and number 3 in FIG. 3B are used as the third silhouette images. In addition, when the object 12*b* is included in the generation target, the third silhouette image of the object 12*b* is as shown in FIG. 3D.

In S902, the virtual viewpoint image generating unit 811 obtains the virtual viewpoint. The acquisition of the virtual viewpoint in S902 is the same process as in the first embodiment (S602 in FIG. 6). In S903, the virtual viewpoint image generating unit 811 generates a virtual viewpoint image of each object to be the generation target using the third silhouette image generated in S901. The method for generating a virtual viewpoint image is the same as the method for generating a virtual viewpoint image by the virtual viewpoint image generating unit 214 of the first embodiment (S603 in FIG. 6). At this time, the virtual viewpoint image generating unit 811 estimates distance information from the virtual viewpoint to each object to be the generation target. A method of estimating the distance information includes, for example, a method of calculating the distance using the three-dimensional shape estimated at the time of generating the virtual viewpoint image. Through the above processes, a virtual viewpoint image in which only one object to be the generation target exists and distance information from the virtual viewpoint to the object are generated for a plurality of generation targets. The virtual viewpoint image generating unit 811 outputs the plurality of virtual viewpoint images generated for the plurality of generation targets to the image combining unit 812. Note that, as in the processes of S603 and S604 of the first embodiment, a process of combining a difference between a virtual viewpoint image having all objects as generation targets and a virtual viewpoint image of the generation target with a virtual viewpoint image of the generation target may be performed.

The image combining unit 812 combines the plurality of virtual viewpoint images generated by the virtual viewpoint image generating unit 811 into one virtual viewpoint image based on the anteroposterior relationship between the videos determined according to the distance to the virtual viewpoint of each object.

According to the second embodiment, the processes of S901 and S903 of the virtual viewpoint image generating unit 811 can be executed in parallel for a plurality of objects. Therefore, in the second embodiment, when a plurality of generation targets are designated, a virtual viewpoint image can be generated at a higher speed than in the first embodiment.

Third Embodiment

In the third embodiment, a virtual viewpoint image is generated at high speed by deleting a voxel that is not a generation target from a three-dimensional shape estimated at the time of integrating object numbers. In addition, in sports competition, there are objects that always exist in the photographing region, such as players and referees, and there are also objects that enter the photographing region for a moment, such as staff members and spectators. In the third embodiment, the number of an object present in a specific region in a photographing region at a certain moment is recorded and is always set as a generation target.

Figure 10:
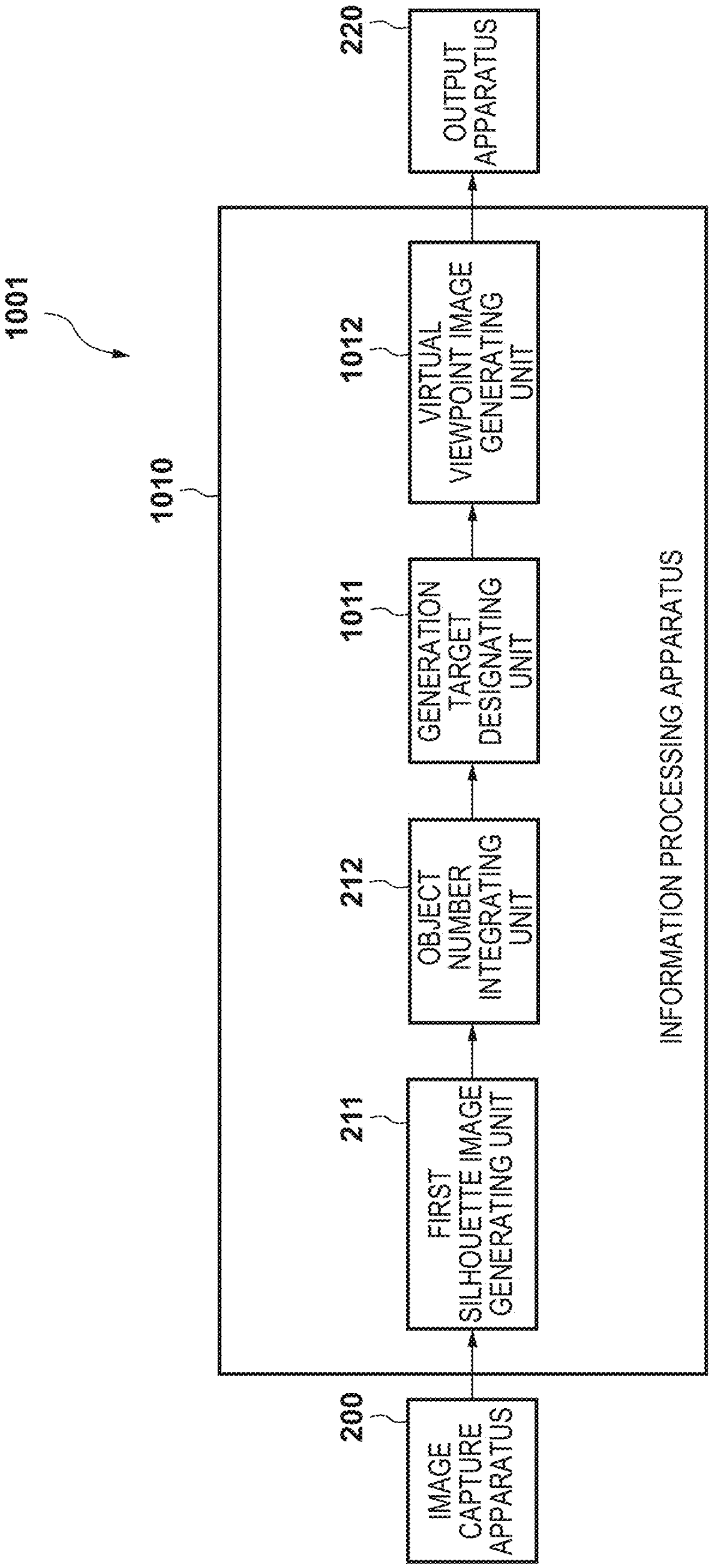
FIG. 10 is a block diagram illustrating a configuration example of an information processing system according to a third embodiment.

FIG. 10 is a block diagram illustrating a configuration example of an information processing system 1001 according to a third embodiment. In the third embodiment, the generation target designating unit 1011 and the virtual viewpoint image generating unit 1012 in the information processing apparatus 1010 are main changes from the first embodiment. Hereinafter, differences from the first embodiment will be mainly described. Note that the information processing system 1001 may be configured by one information processing apparatus. For example, the image capture apparatus 200 and the output apparatus 220 may be realized by the information processing apparatus 1010. Furthermore, the information processing apparatus 1010 may be configured by one electronic device or may be configured by a plurality of electronic devices. Furthermore, the information processing apparatus 1010 according to the third embodiment can be implemented by the same hardware configuration as that of the first embodiment (FIG. 7).

Figure 11:
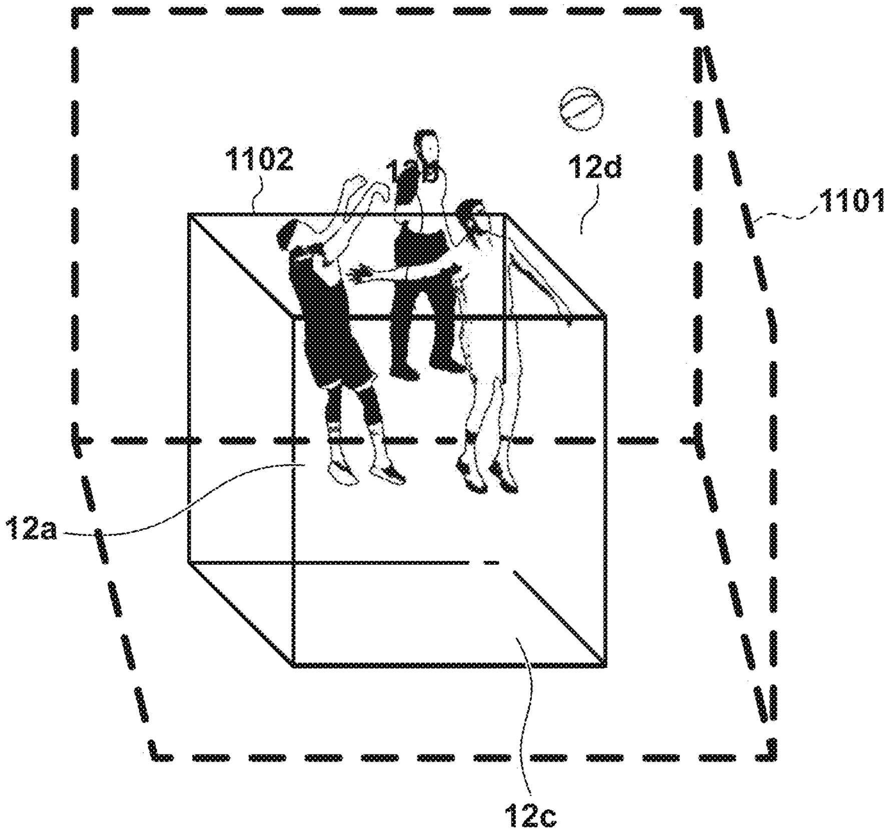
FIG. 11 is a diagram for explaining a generation target designating unit according to the third embodiment.

FIG. 11 is a diagram explaining a method of designating a generation target according to the third embodiment. The generation target designating unit 1011 records the number of the object in the specific region 1102 and outputs the number to the virtual viewpoint image generating unit 1012 as a generation target. For example, as illustrated in FIG. 11, it is assumed that the objects 12*a* to 12*d* exist at a certain time in the photographing region 1101, and the object 12*a* and the object 12*c* exist in the specific region 1102 at a predetermined time. In this case, the generation target designating unit 1011 records the object identification numbers of the objects 12*a* and 12*c* existing in the specific region

1102 at a predetermined time, and outputs the objects 12*a* and 12*c* as generation targets to the virtual viewpoint image generating unit 1012 until an instruction to change the generation targets is given.

The object number integrating unit 212 integrates so that the same object has the same object identification number with respect to the time axis. That is, the same object identification number is assigned to objects tracked as the same object. The tracking of the object is as described in the first embodiment. By tracking the object, the recorded object identification number is treated as a generation target even if the object does not exist in the specific region 1102 as long as the object is in the photographing region 1101. In addition, an object number of an object which is not recorded at the predetermined time (an object which exists outside the specific region 1102 at the predetermined time) or an object which newly appeared in the photographing region 1101 after the predetermined time is not treated as a generation target. Note that the predetermined time may be designated by any method such as designation by a user operation, designation by an external input, designation by a time code, a frame number, or the like determined in advance.

Figure 12:
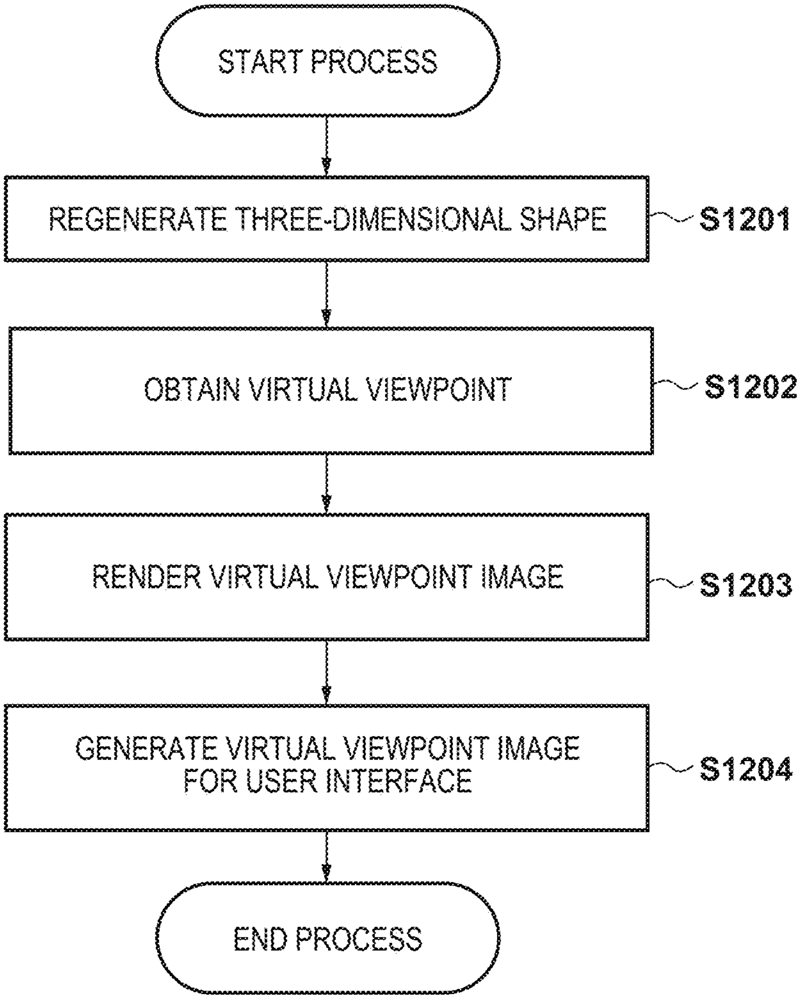
FIG. 12 is a flowchart illustrating a virtual viewpoint image generating process according to the third embodiment.

The virtual viewpoint image generating unit 1012 generates a virtual viewpoint image of a generation target using the three-dimensional shape estimated by the object number integrating unit 212. FIG. 12 is a flowchart illustrating a process by the virtual viewpoint image generating unit 1012 of the third embodiment. The processes of S1202 and S1204 are the same as the processes of S602 and S604 of the first embodiment (FIG. 6).

In S1201, the virtual viewpoint image generating unit 1012 regenerates the three-dimensional shape from the three-dimensional shape estimated by the object number integrating unit 212 such that only the three-dimensional shape of the object to be the generation target remains. The object number integrating unit 212 associates an object number with each voxel representing a three-dimensional shape. Therefore, the virtual viewpoint image generating unit 1012 generates the three-dimensional shape of the generation target by leaving the voxel in which the object number of the generation target is stored and deleting the voxel in which the object number of the generation target is not stored. In S1203, the virtual viewpoint image generating unit 1012 renders the virtual viewpoint image of the generation target to be viewed from the virtual viewpoint based on the three-dimensional shape regenerated in S1201 and the color information obtained from the captured image.

According to the third embodiment, since an object determined as a generation target at a predetermined time always becomes the generation target, designation of a generation target does not need to be repeated, which is convenient. In addition, since the virtual viewpoint image generating unit 1012 regenerates and uses the three-dimensional shape generated by the object number integrating unit 212 to generate the virtual viewpoint image, the processing speed can be increased.

As described above, according to each of the above-described embodiments, a virtual viewpoint image of the generation target can be generated without restricting the object position, posture, and occlusion state. Therefore, in the generation of the virtual viewpoint image, the generation target of the virtual viewpoint image can be flexibly designated, and the degree of freedom in the generation of the virtual viewpoint image is improved.

According to the present disclosure, a virtual viewpoint image of an object designated as a generation target can be generated.

Other Embodiments

In the above-described embodiment, the object number integrating unit 212 determines the visibility from each camera by the three-dimensional shape and integrates the object numbers, but determination may be made by other means. For example, a depth sensor installed at the same position as each image apparatus may be used to determine the visibility by obtaining the distance of the surface from each camera and integrate the object numbers.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-038976, filed Mar. 13, 2023, which is hereby incorporated by reference herein in its entirety.

What is claimed is:

1. An information processing apparatus comprising:

at least one memory storing instructions; and at least one processor executing the instructions causing the information processing apparatus to:

generate, from a plurality of captured images obtained by a plurality of cameras, a plurality of silhouette images representing respective regions of a plurality of objects appearing in the plurality of captured images;

obtain associating information representing a silhouette image associated with each object by associating the plurality of silhouette images with each object of the plurality of objects; and generate, based on the associating information corresponding to an object designated from the plurality of objects and a designated virtual viewpoint, a virtual viewpoint image of the designated object, wherein a silhouette image associated with the designated object is selected from among the plurality of silhouette images based on the associating information corresponding to the designated object, and a silhouette image associated with an object that is not designated from the plurality of objects is excluded, and wherein the virtual viewpoint image is generated using the selected silhouette image such that the virtual viewpoint image includes the designated object and does not include the object that is not designated.

2. The information processing apparatus according to claim 1, wherein a three-dimensional shape is obtained using the plurality of silhouette images, and association for each object of the plurality of silhouette images is performed based on a projection area obtained when each of the plurality of silhouette images is projected onto the three-dimensional shape.

3. The information processing apparatus according to claim 2, wherein a silhouette image is associated with an element present in the projection area of the silhouette image among a plurality of elements constituting the three-dimensional shape, and the association of the silhouette images is performed based on a result of the association of the silhouette image in each of the plurality of elements.

4. The information processing apparatus according to claim 3, wherein for the plurality of elements, visibility from the plurality of cameras is determined, and a silhouette image obtained from a captured image obtained by a camera in which the element is determined to be visible is associated with the element.

5. The information processing apparatus according to claim 3, wherein the association between the element and the silhouette image is supplemented based on association of a silhouette image in an element adjacent to the element.

6. The information processing apparatus according to claim 1, wherein a three-dimensional shape of the designated object is obtained using a silhouette image associated by the associating information corresponding to the designated object, and the virtual viewpoint image of the designated object is generated based on the obtained three-dimensional shape.

7. The information processing apparatus according to claim 6, when the designated object is two or more objects, logical sum synthesis of silhouette images corresponding to the two or more objects is performed for each captured image, and the virtual viewpoint image is generated using the silhouette image obtained by the logical sum synthesis.

8. The information processing apparatus according to claim 6, wherein a silhouette image of the designated object and a silhouette image of an object in an occlusion relationship with the designated object are combined in a distinguishable manner, and the virtual viewpoint image is generated using the combined silhouette image.

9. The information processing apparatus according to claim 8, wherein the virtual viewpoint image generated from the silhouette image of the object in the occlusion relationship is generated with a brightness different from the virtual viewpoint image generated from the silhouette image of the designated object.

10. The information processing apparatus according to claim 6, wherein when the designated object is two or more objects, virtual viewpoint images of the two or more objects is generated using silhouette images of the two or more objects, respectively; and virtual viewpoint images of each of the two or more objects is combined based on a distance between the designated virtual viewpoint and each of the two or more objects.

11. The information processing apparatus according to claim 3, wherein the virtual viewpoint image of the designated object is generated based on a three-dimensional shape obtained by deleting an element not associated with the silhouette image associated with the designated object by the associating information from a plurality of elements constituting the three-dimensional shape generated based on the plurality of silhouette images.

12. The information processing apparatus according to claim 1, wherein a virtual viewpoint image of the designated object and differences between all virtual viewpoint images of the plurality of objects obtained using the plurality of silhouette images and the virtual viewpoint image of the designated object is distinguishably combined.

13. The information processing apparatus according to claim 1, wherein a region is separated for each object in each of the plurality of captured images, and the silhouette image is generated based on the separated region of the object.

14. The information processing apparatus according to claim 13, wherein a region is separated for each object in each of the plurality of captured images by instance segmentation.

15. The information processing apparatus according to claim 1, wherein an object as a generation target of the virtual viewpoint image is designated from among the plurality of objects in accordance with a user operation.

16. The information processing apparatus according to claim 15, wherein an object of the generation target is determined based on a position designated by the user operation on a display screen that displays one captured image of the plurality of captured images.

17. The information processing apparatus according to claim 15, wherein an object of the generation target is determined based on a position designated by the user operation on a display screen that displays the generated virtual viewpoint image.

18. The information processing apparatus according to claim 17, wherein a difference between a virtual viewpoint image including all of the plurality of objects and a virtual viewpoint image of the object of the generation target, and the virtual viewpoint image of the object of the generation target are displayed on the display screen in an identifiable manner.

19. The information processing apparatus according to claim 15, wherein as an object of the generation target, an object present at a predetermined time in a specific region designated by the user operation in photographing regions of the plurality of cameras is determined.

20. The information processing apparatus according to claim 15, wherein a designated state of the object is maintained by tracking the object designated by the user operation.

21. An information processing method comprising:

generating, from a plurality of captured images obtained by a plurality of cameras, a plurality of silhouette images representing respective regions of a plurality of objects appearing in the plurality of captured images;

obtaining associating information representing a silhouette image associated with each object by associating the plurality of silhouette images with each object of the plurality of objects; and generating, based on the associating information corresponding to an object designated from the plurality of objects and a designated virtual viewpoint, a virtual viewpoint image of the designated object, wherein a silhouette image associated with the designated object is selected from among the plurality of silhouette images based on the associating information corresponding to the designated object, and a silhouette image associated with an object that is not designated from the plurality of objects is excluded, and wherein the virtual viewpoint image is generated using the selected silhouette image such that the virtual viewpoint image includes the designated object and does not include the object that is not designated.

22. A non-transitory computer-readable storage medium storing a program for causing a computer to execute an information processing method, the information processing method comprising:

generating, from a plurality of captured images obtained by a plurality of cameras, a plurality of silhouette images representing respective regions of a plurality of objects appearing in the plurality of captured images;

obtaining associating information representing a silhouette image associated with each object by associating the plurality of silhouette images with each object of the plurality of objects; and generating, based on the associating information corresponding to an object designated from the plurality of objects and a designated virtual viewpoint, a virtual viewpoint image of the designated object, wherein a silhouette image associated with the designated object is selected from among the plurality of silhouette images based on the associating information corresponding to the designated object, and a silhouette image associated with an object that is not designated from the plurality of objects is excluded, and wherein the virtual viewpoint image is generated using the selected silhouette image such that the virtual viewpoint image includes the designated object and does not include the object that is not designated.

* * * * *